United States Patent [19]

Peterson

[11] Patent Number: 4,861,475
[45] Date of Patent: Aug. 29, 1989

[54] DEVICE FOR ABSORBING LIQUID CONTAMINANTS SUCH AS OIL AND GASOLINE AND FUMES THEREOF

[76] Inventor: Gary J. Peterson, P.O. Box 822, Homer, Ak. 99603

[21] Appl. No.: 766,505

[22] Filed: Aug. 19, 1985

[51] Int. Cl.⁴ ............................................... C02F 1/40
[52] U.S. Cl. ................................ 210/242.4; 210/282; 210/924
[58] Field of Search ................ 210/242.4, 282, 693, 210/924, 694

[56] References Cited

U.S. PATENT DOCUMENTS

| | | | |
|---|---|---|---|
| 3,739,913 | 6/1973 | Bogosian | 210/242.4 |
| 3,904,528 | 9/1975 | Yocum | 210/242.4 |
| 4,172,039 | 10/1979 | Akiyama | 210/242.4 |
| 4,357,174 | 11/1982 | Rushbrook et al. | 210/694 X |
| 4,366,067 | 12/1982 | Golding et al. | 210/242.4 |
| 4,497,712 | 2/1985 | Cowling | 210/242.4 |
| 4,505,727 | 3/1985 | Cullen | 210/282 X |

*Primary Examiner*—Tom Wyse
*Attorney, Agent, or Firm*—John J. Leavitt

[57] ABSTRACT

Presented is a device which includes a container within which is confined a body of material that will absorb liquid oil and gasoline and also the fumes generated by these two liquid contaminants. The container is provided with a multiplicity of openings formed in such a way as to prevent the intrusion of water with which the oil and gasoline may be mixed, but which permits the passage of the oil and gasoline. The container is constructed in such a way that as the weight of the container increases because of the absorption of liquid oil and gasoline floating on water, the container progressively sinks into the water until the openings in the container are completely submerged, thus entrapping within the container all of the oil and gasoline that has been absorbed and the fumes thereof. When placed in a compartment where liquid oil or gasoline is present in the absence of water, the device will absorb the oil and gasoline and vapors thereof and retain them trapped within the container.

4 Claims, 3 Drawing Sheets

DEVICE FOR ABSORBING LIQUID CONTAMINANTS SUCH AS OIL AND GASOLINE AND FUMES THEREOF

BACKGROUND OF THE INVENTION

1. Field of the Invention.

This invention relates to devices for absorbing liquid contaminants such as oil and gasoline and the fumes or vapors thereof, and particularly to such a device that may be deposited in the engine compartment of a boat, or in the hold of a ship in which water and/or liquid contaminants are spilled, and which will absorb the liquid oil and/or gasoline and the fumes or vapors thereof even if the device is floating in the body of water contained in the engine compartment or hold of the ship, or merely present in the same compartment with vapors, and which will automatically seal itself when it has absorbed its maximum capacity of the contaminant.

2. Description of the Prior Art.

A preliminary patentability search for prior art patents has been conducted in connection with this invention in Class 210, sub-classes 242.1, 242.4, 690, 691, 692, 693, 622 and 924; and Class 405, sub-classes 60, 63 and 64. As a result of the search in this area of search, nine United States patents were found to exist that relate to the subject matter to which the subject invention pertains. Those patents are as follows:

| | | |
|---|---|---|
| 3,617,566 | 3,627,677 | 3,703,464 |
| 3,904,528 | 3,912,635 | 3,920,554 |
| 4,172,039 | 4,197,204 | 4,497,712 |

It will be readily apparent from the many patents noted above that the problem of absorbing liquid oil and gasoline has been troublesome for many years. Many inventors have attempted to find a solution to the problem, but because the basic problem is fragmented into many smaller problems, there appears to be no single solution that is applicable to all problems related to spilled oil, gasoline, solvents or acids. Contaminants can and do take many forms. Thus, on the high seas, oil tankers can rupture and spill crude oil into the open sea. Here, one of the problems is to stem the leak, while attempting to prevent the spread of the oil slick beyond manageable limits. The subject matter of the present invention does not lend itself to solving the problems inherent in such an oil spill on open water on the high seas.

In relatively confined areas, such as the hold of a ship, in the bilge area of pleasure boats, or on water-borne barges, hydrocarbons such as oil and/or gasoline are frequently spilled and mix with water shipped on board over the sides of the vehicle during rough weather, or from other sources. Such spilled hydrocarbons, particularly gasoline and solvents, are highly flammable and volatile, releasing vapors into the confined area, which are also highly flammable and explosive when ignited.

It is clear from the patent literature noted above that the concept of using some type of an absorbent material for absorbing hydrocarbon compounds but rejecting water is old in the art. In some of these patents, the absorbent material itself is of a type that rejects absorption of water while absorbing the hydrocarbon compounds. In other of the patents, the absorbent material is contained within a skin-like container that permits the passage of a contaminant, such as a hydrocarbon compound, but does not permit the passage of water, so that the absorbent material is not exposed to the water, only to the hydrocarbon compound. In none of these patents, however, is there provision for a device which automatically seals to prevent the escape of contaminants or their vapors when fully saturated.

It is one of the objects of the present invention to provide a container for absorbent material that will absorb hydrocarbon type compounds such as oil and gasoline, and which will preclude the passage of water into the interior of the container during the absorption process.

Another object of the invention is the provision of a container constructed in such a manner that the entire container containing absorbent material may be deposited in an engine compartment, or the hold of a ship that contains water, or in a bilge area, the container being designed to float on the contaminated water and absorb oil or gasoline from the water while not absorbing water.

A still further object of the invention is the provision of a container filled with an absorbent material and having openings designed to permit the passage of oil or gasoline spilled on water, but which will prevent the passage of water into the interior of the container and which, upon progressive absorption of the hydrocarbon compounds, progressively sinks lower in the water and ultimately seals itself by virtue of the depth to which it sinks, so as to prevent the escape of liquid hydrocarbons and fumes from the contained and absorbed hydrocarbon compounds such as oil and gasoline.

It is known that oil and gasoline frequently spill into the bilge areas of commercial and recreational vessels. Such contaminants are not limited to oil and gasoline, but may include solvents of various kinds and acids, such as battery acid. These contaminants, whether they be hydrocarbon fuels or solvents or acids, frequently float on the water that may be found in bilge areas or in motor compartments of motor boats, for instance. Such spilled contaminants release dangerous fumes and vapors into the confined area within which the contaminant is trapped. In many cases, these fumes present a greater hazard of fire and explosion than the free-floating liquid contaminants. Accordingly, it is another object of the invention to provide a device which may be deposited in the bilge or motor compartment of a commercial or recreational vessel and which will absorb dangerous and explosive fumes or vapors from the confined area, even if not directly in contact with the liquid source of such fumes or vapors, and which prevents the release of the vapors once they are absorbed.

A still further object of the invention is the provision of a device which after absorption of contaminants, seals the contaminants within a container so that the fumes or vapors of the contaminant will no longer be released to the atmosphere.

The invention possesses other objects and features of advantage, some of which, with the foregoing, will be apparent from the following description and the drawings. It is to be understood however, that the invention is not limited to the embodiment illustrated and described, since it may be embodied in various forms within the scope of the appended claims.

SUMMARY OF THE INVENTION

In terms of broad inclusion, the device for absorbing liquid contaminants such as oil, gasoline, solvents, acids, and fumes thereof comprises a container having a plurality of openings designed in such a way as to permit the passage of contaminants into the interior of the container, but preclude the passage of water therethrough. Within the container is a body of material which forms an absorbent that has an affinity for the contaminants. A number of different sorbent materials may be contained within the container to absorb the contaminants. Some of these sorbent products will absorb the contaminant but repel water. Others absorb both water and contaminants. Still others are selective of the contaminant to be absorbed. It is the purpose of this invention, in one of its aspects, to provide a container that prevents the passage of water into the container, thus preventing water from reaching the absorbent material, whether it be of the type that absorbs water, or of the type that repels water. In this regard, the container is formed with a multiplicity of spaced slits that are gauged to permit the passage of hydrocarbon-type compounds such as oil and gasoline, and acids and the fumes of such products, but which prevent the passage of water. The height of the slits in the wall of the container cooperates with the absorbent material in such a way as to seal the slits when the sorbent material contained within the container has fully absorbed as much contaminant as it can contain, i.e., when it reaches saturation. The container may comprise a unitary hollow body having appropriate slits and sealed after filling with selected sorbent material, or it may be a two-part structure assembled before, during or after filling with sorbent material and having slits that will automatically be sealed by water when the sorbent material has reached saturation or near-saturation. In a "dry" environment, i.e., where only a contaminant is present in the absence of water, whether the contaminant be a vapor or a liquid, the device will absorb and hold the contaminant against release.

DESCRIPTION OF THE PREFERRED EMBODIMENT

Figure 3:
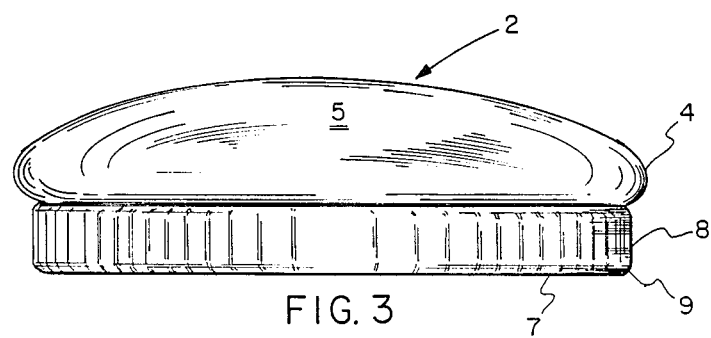
FIG. 3 is a side elevational view of the assembled device.
Figure 4:
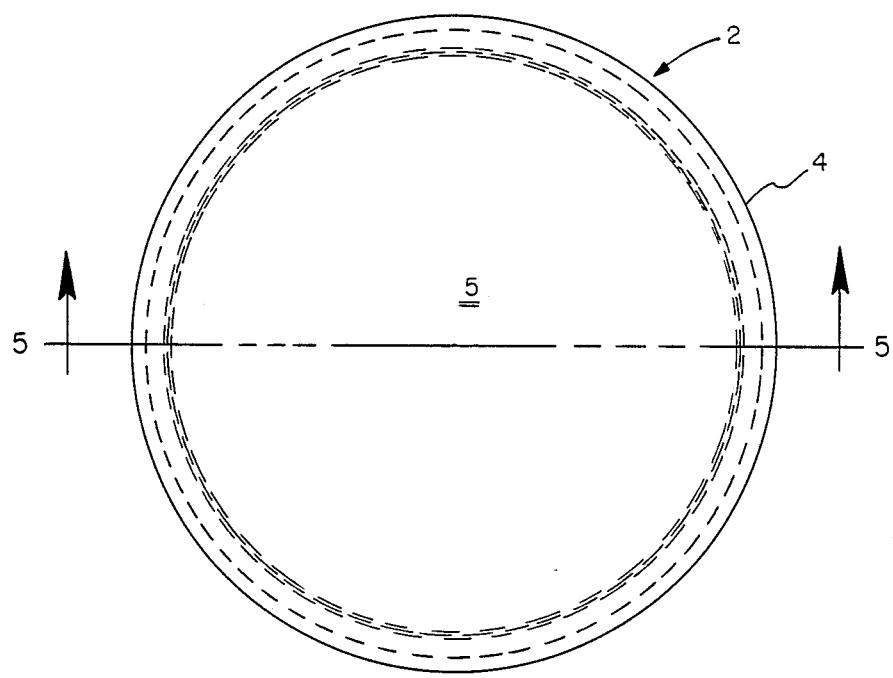
FIG. 4 is a plan view of the assembled device.
Figure 5:
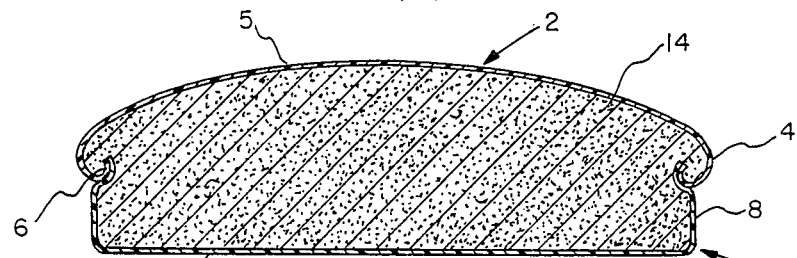
FIG. 5 is a vertical cross-sectional view taken through the device, the section taken in the plane indicated by the line 5—5 of FIG. 4.

In terms of greater detail, the device of this invention for absorbing liquid contaminants such as oil, gasoline, solvents and acids, and fumes thereof, comprises a lid, cap or cover designated generally by the numeral 2, a base member designated generally by the numeral 3, and a quantity of sorbent material 14 disposed between the cover and the base when the cover and base are interlocked, as illustrated in FIGS. 3 and 5.

Referring to the embodiment of the invention illustrated in FIGS. 1 through 6, it will be seen that the cover 2 is formed circularly and possesses a dome-shaped configuration, having an outer circular periphery 4, a domed top surface 5, which is preferably fabricated from an appropriate transparent synthetic resinous material such as polystyrene, or any other similar or appropriate plastic, or other material, which is impervious to most contaminants such as gasoline, solvents, acids and oils. As illustrated in FIG. 5, the outer periphery 4 of the cover 2 is provided with a re-entrant portion 6 that curls inwardly into the interior of the dome, to form a circular bead around the inner periphery of the opening into the dome-shaped cover 2.

Figure 1:
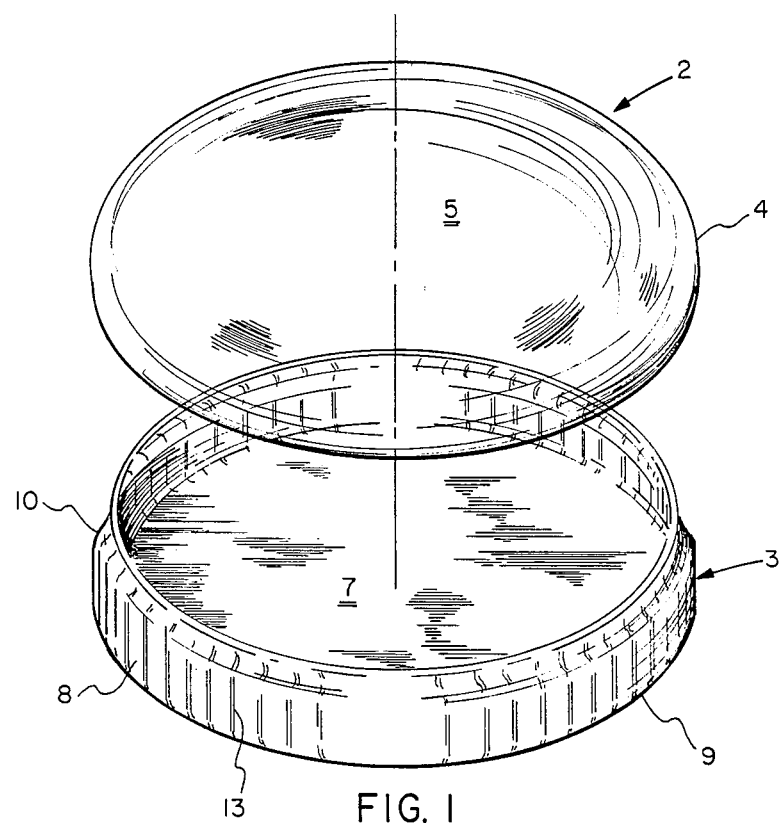
FIG. 1 is a perspective view of one embodiment of the invention illustrating a two-part container within which is contained the absorbent material.
Figure 2:
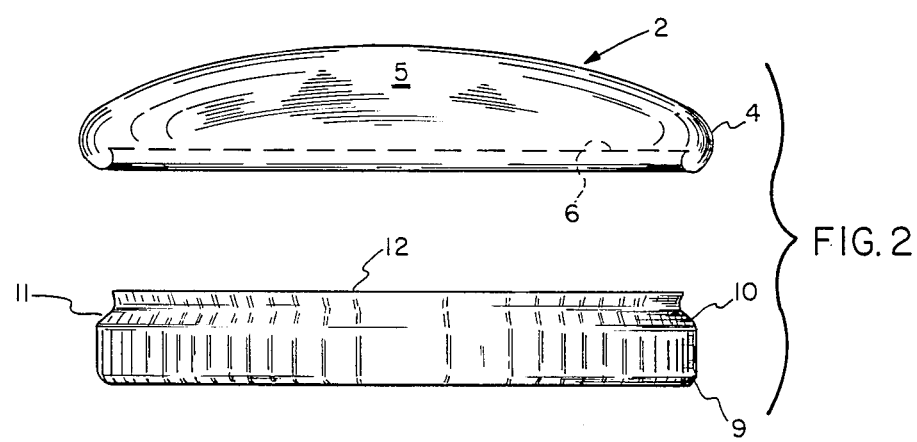
FIG. 2 is a composite exploded view illustrating the cover and base components of the container of FIG. 1 in side elevation.

The transparent plastic cover 2, by virtue of the re-entrant bead 6, is adapted to fit snugly and lock onto the base member 3 in a detachable manner, or in a manner which may be considered to be permanent once the two members are brought together into interlocking relationship. In the embodiment illustrated in FIGS. 1 through 6, the former type of detachable interengagement is contemplated, but it should be understood that even this type of detachable interengagement may easily be converted into a permanent type engagement by the addition of an appropriate adhesive. As illustrated in FIGS. 1 and 2, the base member 3 in this illustration is generally circular, having a bottom wall 7, a generally perpendicular side wall 8, the side wall and bottom wall 7 being integral at their union 9. The upper end of the vertical wall 8 is formed with a radially inwardly projecting circular portion 10 which curves inwardly from the vertical portion of the wall, then curves smoothly radially outwardly to form a radially-inwardly projecting bead 11 adjacent the upper rim portion 12.

Formed in the side wall 8 of the base unit 3 are a multiplicity of slits 13 that extend as indicated in 5A from the bottom 7 through the rim edge 12 of the base member 3. The slits 13 are spaced circumferentially around the vertically extending side wall 8 in a regular series, and in this embodiment, with the slits extending partially around the union 9 between the side wall 8 and the bottom wall 7, each pair of adjacent slits thus divides the wall 8 into a multiplicity of resilient fingers which are physically spread inwardly to a slightly smaller diameter when the cover 2 is lowered into position and the bead 6 is pushed into the circular groove formed by the outer periphery of the bead 11. Thus, the bead 6 functions as a cam surface to cam the resilient fingers inwardly, their inherent resilience then causing the fingers to move radially outwardly, with the bead groove 11 engaging the bead 6 in a detachable manner to permit detachable interengagement of the cover 2 and the base member 3.

Preferably, the slits 13 are spaced approximately ⅛ of an inch apart around the circular periphery of the base member, with the width of the slits being gauged to cooperate with the surface tension of the liquid in which it is intended that the device be immersed. Thus, for placement in the bilge of a motor boat, for instance, where the device is apt to come in contact with spilled gasoline floating in a body of water, it may be intended that the gasoline pass through the slits but that the water not be permitted to pass through the slits. In these circumstances, the slits would be sized so that the surface tension of the water would prevent the water from passing through the slits while permitting the gasoline, which has a much lower surface tension than water, to pass freely through the slits. Stated another way, the slits may be selectively sized so that the size of the slit determines whether the sides of the slit are "wet" by a liquid compound intended to pass through the slits, and not be "wet" by a liquid compound intended to be precluded from passing through the slits.

Surface tension is defined as that property, due to molecular forces, existing in the surface film of all liquids which tends to contract the volume into a form with the least surface area. Stated another way, the particles in the surface film are inwardly attracted, thus resulting in tension. By way of example, the surface tension of water at 20° C. is 72.75 dynes per centimeter. Generally, the surface tension decreases as the temperature increases. By comparison the following liquids possess surface tensions in dynes per centimeter at 20° C.:

| Acetone | 23.7 | Dynes/Centimeter |
|---|---|---|
| Benzene | 28.9 | " |
| Carbon tetrachloride | 26.8 | " |
| Chlorine | 18.0 | " |
| Ethyl/alcohol | 22.27 | " |
| Methyl ethyl Ketone | 24.6 | " |
| Nitrous oxide | 1.75 | " |
| Toulene | 28.43 | " |

Thus, comparing the surface tension of water with the relatively lower surface tensions of the compounds listed above, it will be obvious that these compounds will pass through a properly sized slit while water will be precluded from passing through the slit.

Figure 5B:
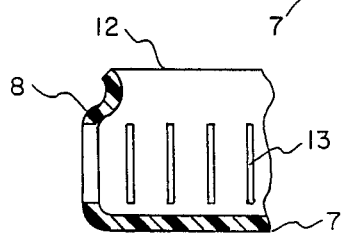
FIG. 5B is a fragmentary enlarged vertical cross-sectional view illustrating a base component with an alternate slit arrangement.

Referring to FIG. 5B, there is there shown an alternate construction in which the slits 13' do not continue through the union 9 and into the bottom 7 of the base member, and do not extend through the rim 12. In this embodiment, the material can be chosen from one of the many synthetic resinous materials that is impervious to gasoline, oil, acids and solvents, and can be configured so that the bead 6 again forms a cam surface tending to constrict the rim 12 sufficiently for the bead 6 to drop into the recess formed around the neck 11 of the base member. In this construction, the union of the cover with the base member would be more or less permanent, and could be rendered permanent by placement of a small amount of adhesive between the mating surfaces. Again, however, the slits 13' as illustrated in FIG. 5B are spaced apart circumferentially about the vertical wall 8 of the base member, and are sized as before to permit the passage of selected contaminating compounds, while preventing the passage of a liquid such as water.

Regardless of the manner of attachment of the cover 2 to the base member 3, whether that attachment be a detachable one, or a permanent one, the interior of the container thus formed is filled, or substantially filled, with an appropriate sorbent material designated generally by the numeral 14 which in FIG. 5 is illustrated as filling the entire container. Thus, this sorbent material may be any one of the many different types of sorbent materials described in the patents noted above, or an appropriate combination thereof to accomplish specific purposes. For instance, the coir dust described in U.S. Pat. No. 3,703,464 may be used to fill the container. Alternatively, a portion of the container may be filled with the coir dust, while the remainder of the space within the container is filled with the type of material described in U.S. Pat. No. 3,617,566, namely, atactic, non-crystalline polypropylene having a molecular weight of 10,000 to 100,000. It will be seen from this that it is not intended that the invention be limited to a specific sorbent material. Rather, it is intended that whatever particular sorbent material is necessary for a given circumstance be included within the container, it being understood and contemplated that different situations will require different sorbent fillers. In like manner, while I have illustrated the invention as being embodied in a circular configuration, this has been done simply for non-limitative illustrative purposes, and in no way is it contemplated that the configuration of the container be a limitation. Thus, the container may just as easily be octagonal or square. In appropriate circumstances, the container might even be spherical.

Figure 6:
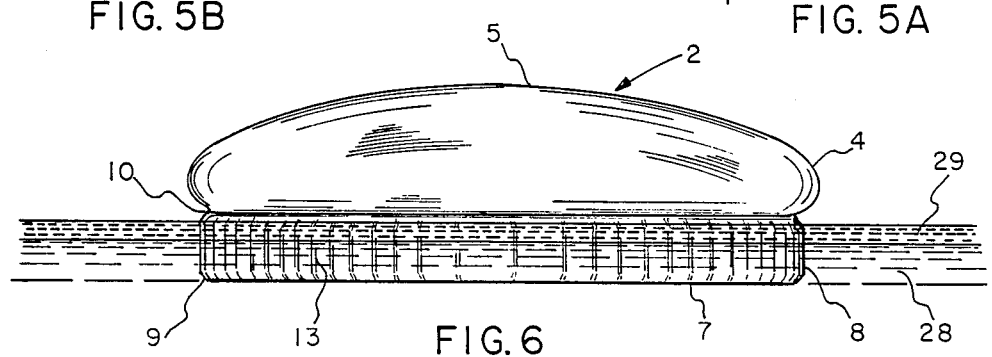
FIG. 6 is a side elevational view illustrating the device floating in a body of water that contains a contaminant on the surface thereof, and illustrating the manner in which the slits formed in the container are sealed by the progressive sinking of device into the water as contaminant is absorbed.
Figure 7:
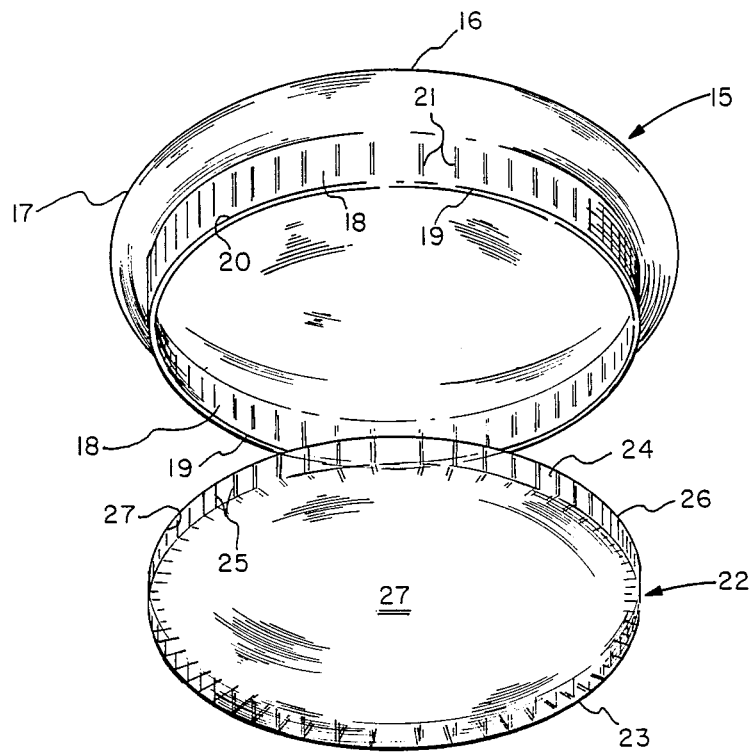
FIG. 7 is a view similar to FIG. 1, but showing a different embodiment of the invention in which interengaging portions of both the base and the cover are provided with a multiplicity of circumferentially spaced slits for the admission of a contaminant to the absorbent material within the container.
Figure 8:
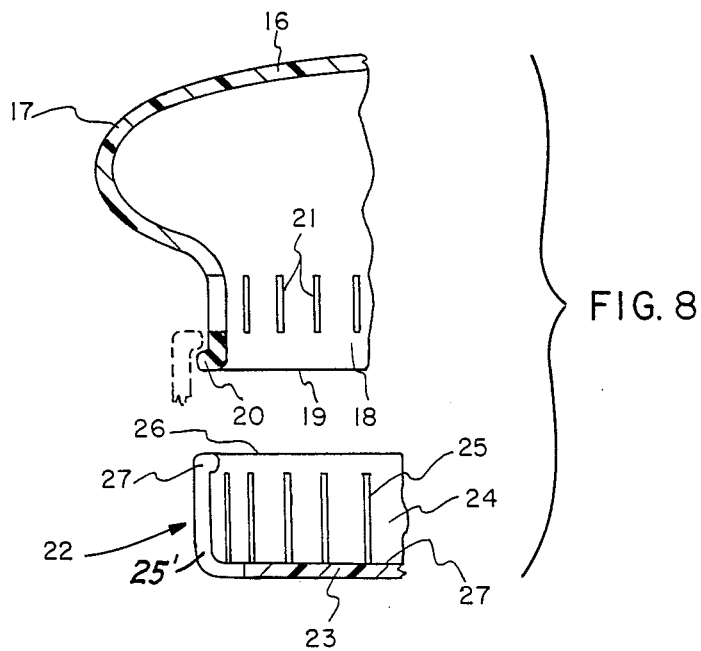
FIG. 8 is an enlarged fragmentary composite exploded sectional view illustrating the interconnecting relationship and contaminant-admitting slits formed in the peripheral walls of the cover and base unit of the container illustrated in FIG. 7. Interengagement of the base and cover is shown in broken lines.

Referring to the embodiment of the invention illustrated in FIGS. 7 and 8, it will there be seen that the cap or cover is designated generally by the numeral 15, and again configured in a non-limitative way as a circular construction having a domed upper surface or wall 16 merging smoothly and integrally with a convex periphery 17 which in turn merges smoothly and integrally with a generally cylindrical skirt portion designated generally by the numeral 18. The cover is preferably fabricated from a suitable synthetic resinous material, and is preferably transparent. As indicated in FIG. 8, the generally cylindrical wall portion 18 that merges smoothly with the convex wall portion 17 is somewhat smaller in diameter than the peripheral wall portion 17, giving the cover a generally bulbous configuration. The skirt or cylindrical wall portion 18 is provided at its lower edge 19 with a radially outwardly projecting bead 20 which gives strength to the edge 19 and functions also as a locking member as will hereinafter be explained. The skirt portion 18 is also provided with a multiplicity of circumferentially spaced slits 21 spaced apart approximately ⅛ of an inch, but each of the slits possessing a transverse width that is gauged to the surface tension of the liquid contaminant which it is intended be absorbed into the device as previously explained in connection with the embodiment of the invention illustrated in FIGS. 1 through 6.

The cover is intended to interlock either detachably or permanently with a dish-shaped base member 22, having a bottom wall 23 and a generally cylindrical side wall 24, the side wall 24 having a multiplicity of circumferentially spaced slits 25 as illustrated, a major portion of the slits 25 terminating short of the upper rim 26 of the base and extending downwardly to the top surface 27 of bottom wall 23. At two, three or four, or more, diametrically opposed positions around the periphery of the base member 22, the slits at these positions may be extended as illustrated at the left of the base in FIG. 8, so that the slit 25' extends through the bead 20 and for a short distance into the bottom wall 23. The purpose of these slits 25' is to provide a relief to permit the upper rim 26, which is provided with a radially inwardly projecting bead 27, to resiliently slip past the bead 20 on the cover 15 during the interengagement of the cap 15 and the base member 22. Alternatively, these relief slits 25' may be omitted and the beads 20 and 27 may be configured and dimensioned so that upon appropriate pressure being exerted between the base and cover, the two beads will slip past each other and lock the two parts together more or less permanently. It will of course be obvious that other types of connecting means may be provided to the rims 19 and 26 of the cover 15 and base member 22, respectively, one such alternate means being an interrupted bead with the bead of one portion, say the base, passing between bead portions on the cover, with relative rotation of the members effecting a locking action between the two parts.

Figure 5A:
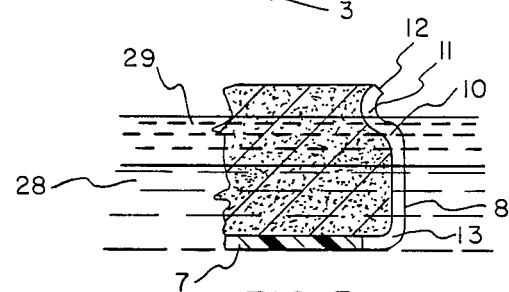
FIG. 5A is a fragmentary enlarged vertical cross-sectional view illustrating the height of one of the slits formed in the vertical wall of the base component of the container illustrated in FIG. 2.

As illustrated in FIG. 5A and FIG. 6, it is intended that the device of this invention, filled with an appropriate sorbent material as previously discussed, be placed into a relatively confined area where a hydrocarbon fluid such as gasoline, or oil, or an acid from a battery, for instance, or a solvent spilled from whatever source, is floating on a body of water within the confined area, such as the bilge area of a motor boat, or the hold of a ship. In FIGS. 5 and 6, the water is illustrated at 28, while the contaminant compound is illustrated at 29. In use, the device is placed in the water, and sinks to a predetermined level at which the slits 8 or 25 are exposed to the contaminant 29, permitting the contaminant to pass through the slits and to be absorbed by the sorbent material contained within the container.

Since the slits are configured so as to prevent water from passing through the slits, the only compound that will be absorbed will be the contaminant compound. As the sorbent material absorbs contaminant compound, the device will become heavier and will sink lower into the water. Ultimately, the device will sink so low into the water that only water covers the slits, thus sealing such slits and preventing fumes from escaping the interior of the container which is now filled with absorbed hydrocarbon fuel and fumes. If a contaminating hydrocarbon fuel still remains floating on the water, additional devices may be disposed on the water until such hydrocarbon fuels and fumes are completely absorbed and no longer constitute an explosion or fire danger, or at the very least are no longer expelled from the bilge area by bilge pumps to contaminate the surrounding body of water in which the boat is operating.

Upon removal from the bilge area or hold of the ship, which may be done by hand, or by appropriate mechanical means, depending upon the size of the container, the container, now laden with hydrocarbon fuel and fumes absorbed into the absorbent material 14, may be disposed of in any number of ways. For instance, where the container is formed in such a way that the cover may be detached from the base member, the contaminant-laden material may be removed from the container and the container refilled with fresh sorbent material and reused. On the other hand, where these devices are fabricated in such a way as to be permanently sealed, the entire container may be disposed of in any appropriate manner. Alternatively, the hydrocarbon fuels or other contaminants may be washed from the absorbent filler filling the interior of the container, using an appropriate solvent for the particular hydrocarbon or contaminant that has been absorbed, and the device re-used to re-absorb more contaminants.

It should be understood that while I have illustrated different embodiments of the container as being constructed from a cover and a base member, thus providing a two-part container, under appropriate circumstances, the container may be formed by blow molding an appropriate synthetic resinous material, in much the same way that plastic bottles are formed, but providing for predetermined sized slits, there being provided an opening through which absorbent material may be deposited within the container, the opening subsequently being sealed by an appropriate means. In the interest of brevity in this description, such alternate container configurations and structures have not been illustrated or described, but it should be understood that such containers are included within the scope of the appended claims.

It should also be understood that while I have emphasized use of the device in an environment where water is present and the contaminant floats on the water, this has been done in the belief that this is the most difficult "spill" to clean up. It will of course be obvious that the device is just as effective in the absence of water, i.e., where only a liquid contaminant and/or vapor are present.

Having thus described the invention, what is believed to be new and novel and sought to be protected by Letters Patent of the United States is as follows.

I claim:

1. A device for absorbing liquid contaminants such as oil and gasoline and/or the fumes thereof, comprising:
    (a) a hollow container having a wall defining a storage space, said wall having a multiplicity of openings sized to admit said contaminant through said openings into the interior of said container and preclude the passage of water therethrough;
    (b) a body of sorbent material enclosed within said container and having an affinity for said contaminants, whereby said contaminants are sucked through said openings and absorbed by said sorbent material;
    (c) said container being formed of two parts comprising a cap and a base and means are provided for detachably securing said cap to said base;
    (d) said openings are formed in said base member; and
    (e) each of said two container parts comprises a dish-shaped receptacle having a transverse wall integral with a generally perpendicularly extending peripheral wall having a rim portion defining the open end of the receptacle, the rim portion of one of said container parts including a radially inwardly projecting bead, while the rim portion of the other container part is formed with a peripheral groove adapted to receiving mating relationship the bead of said first mentioned part, whereby said two parts of the container are retained interlocked in mutually facing relationship.

2. The combination according to claim 1, in which said openings comprise a multiplicity of elongated slits forming passageways through the wall of said base member.

3. The combination according to claim 2, in which said elongated slits extend partially into the transverse wall of one of said two receptacles and through the rim portion of said receptacle, whereby adjacent pairs of slits define a finger-like peripheral wall portion.

4. The combination according to claim 2, in which selected ones of said slits extend partially into said transverse wall and through said rim portion whereby one peripheral wall portion may be resiliently displaced toward and away from another peripheral wall portion to accommodate passage of the rim portion of the mutually facing container part.

* * * * *